United States Patent

[11] 3,607,047

| [72] | Inventors | Henry T. Broom;<br>James O. McWhorter; Michael R. Basila, all of Tyler, Tex. |
|---|---|---|
| [21] | Appl. No. | 836,595 |
| [22] | Filed | June 25, 1969 |
| [45] | Patented | Sept. 21, 1971 |
| [73] | Assignee | Lowe-Baker Engineers, Inc., Tyler, Tex. |

[54] AMMONIA SEPARATION PROCESS
10 Claims, No Drawings

[52] U.S. Cl. ................................... 23/196, 55/70
[51] Int. Cl. ................................... C01c 1/12
[50] Field of Search ............................ 23/2, 196; 55/48, 70

[56] References Cited
UNITED STATES PATENTS
2,288,176  6/1942  Bachr.......................... 23/196

Primary Examiner—Reuben Friedman
Assistant Examiner—R. W. Burks
Attorneys—Johnston, Root, O'Keeffe, Keil, Thompson and Shurtleff, John G. Premo and E. J. Mooney ABSTRACT: Ammonia is separated from a mixture containing ammonia and at least one of hydrogen sulfide and carbon dioxide, e.g., a coal gas, by a process comprising contacting the mixture with a phenolic liquid, e.g., cresols, for a time sufficient to provide a ratio of total moles of ammonia absorbed by the liquid to moles of phenolic in the liquid between 0.5 and 1.0, and thereafter separating the resulting mixture from the resulting phenolic liquid.

AMMONIA SEPARATION PROCESS

BACKGROUND OF THE INVENTION

This invention relates to processes for separating ammonia from a mixture containing ammonia and at least one of hydrogen sulfide and carbon dioxide by use of a selective liquid absorbent.

Mixtures of ammonia and at least one of hydrogen sulfide and carbon dioxide are produced in many petroleum treating processes, e.g., the hydroconversion processes. It would be highly desirable to separate ammonia from these mixtures in a form that could be used in other chemical processes. The most desirable form, of course, would be that of free ammonia.

It is known that ammonia can be obtained from solutions or gases that contain other gaseous weak acids, e.g., hydrogen sulfide, by treating the solution or gas with certain weak organic acids, e.g., phenols, cresols, glycine, and the like, so as to absorb less than 0.45 moles of ammonia per mole of organic acid where the temperature is preferably between 122 and 220° F. See German Pat. No. 741,222. By using the process of that patent, the molar ratio of ammonia absorbed by organic acid to hydrogen sulfide absorbed by organic acid is typically less than about thirty to one.

SUMMARY OF THE INVENTION

It has now been found that ammonia is separated from a mixture containing ammonia and at least one of hydrogen sulfide and carbon dioxide by a process comprising contacting the mixture with phenolic liquid for a time sufficient to provide a ratio of total moles of ammonia absorbed by the liquid to moles of phenolic in the liquid between about 0.5 and 1.0. By conducting the ammonia separation process in this manner, the molar ratio of ammonia absorbed by the liquid to hydrogen sulfide and carbon dioxide absorbed by the liquid is surprisingly high. Whereas this ratio using the prior art process was typically around 20 or 30:1 to 1, the ratio utilizing the process of the present invention can approach 60:1, 90:1, 150:1, 200:1, or even higher.

In order to practice this invention, the mixture containing ammonia and at least one hydrogen sulfide and carbon dioxide is contacted with a phenolic liquid in any convenient manner, e.g., in a packed tower or spray tower, for a time sufficient to provide a ratio of total moles of ammonia absorbed by the liquid to moles of phenolic in the liquid between 0.5 and 1.0. Preferably, the resulting mixture and resulting phenolic liquid are then separated so as to produce a substantially ammonia-free mixture. Ammonia can be obtained from the resulting phenolic liquid merely by heating.

The mixture containing ammonia and at least one of hydrogen sulfide and carbon dioxide is preferably a gaseous mixture, but the process of this invention can be applied to solutions containing gaseous ammonia and at least one of hydrogen sulfide and carbon dioxide dissolved therein. Preferred gaseous mixtures are those that contain ammonia and hydrogen sulfide with minor amounts of hydrocarbons, mercaptans and other weak acids, e.g., hydrocyanic acid. Of course, carbon dioxide can also be present in the above-preferred type of gaseous mixture, either in addition to hydrogen sulfide or in place thereof. Typical gaseous mixtures of these types include coal gas, natural gas, oil gas, and the various synthetic gases produced in hydrocarbon conversion processes. The composition of the mixture is not critical to this invention so long as it contains ammonia and at least one of hydrogen sulfide and carbon dioxide.

The phenolic liquid is comprised of at least one mono- or polynuclear mono- or polyhydroxy phenol or derivatives thereof. Typical phenolics include phenol; the alkyl phenols having up to about six carbon atoms in the alkyl group, e.g., o-cresol, m-cresol, p-cresol, p-n-hexyl phenol, and the like; the alkoxy phenols having up to about six carbon atoms in the alkyloxy group, e.g., o-methoxyphenol, phenol p-ethoxy phenol, pn-hexoxy phenol; the halophenols, e.g., p-cholorophenol, m-bromophenol, and the like; the hydroxy phenols, e.g., catechol, resorcinol hydroquinone, and the like; naphthol; and the xylenols, e.g., o-xylenol, m-xylenol and p-xylenol. Preferred phenolic liquids are those that are substantially a mixture of phenol and the cresols. Each of the cresols, i.e., o-cresol, m-cresol and p-cresol individually as well as in combination with themselves and with other phenolics are also preferred liquids. The phenolic liquid can be used by itself or in conjunction with suitable solvents, e.g., hydrocarbon oils, mercaptans and the like. Water can also be present as a solvent, and its effect will be discussed later. Preferred phenolic liquids are those containing essentially no other solvents other than those acquired from the mixtures during processing.

The temperatures at which the mixture and phenolic liquid are contacted may vary, but it is generally preferred to carry out the absorption process of this invention at temperatures between about 70° and 175° F., and preferably between about 100° and 150° F. Most preferred temperatures are those between about 110° and 120° F. Operating absorption pressures can also vary and are typically around atmospheric pressure. Pressure, however, is not critical and both subatmospheric and superatmospheric pressures can be employed. For example, it has been found that an increase in pressure actually improves the operation of this invention in some instances and pressures of 6 p.s.i., 15 p.s.i., or even higher can be used with good results.

As before stated, the mixture containing ammonia and at least one of hydrogen sulfide and carbon dioxide is kept in contact with the phenolic liquid for a time sufficient to provide a ratio of total moles of ammonia absorbed by the liquid to moles of phenolic in the liquid between 0.5 and 1.0. Typically, best results are obtained when this ratio is between about 0.65 and 0.95, with optimum conditions being where the ratio is between about 0.8 and 0.9. By conducting the absorption process in this manner, the molar ratio of ammonia to hydrogen sulfide and carbon dioxide absorbed in the phenolic liquid is greatly increased in comparison with prior art processes, and this leads to greater selectivity in absorption of the desired ammonia.

The effect of water on the process of this invention is quite unusual. It has been found that minor amounts of water being present in the phenolic liquid are not detrimental phenol liquid the countercurrently selectivity referred to above, but as more and more water becomes present in the liquid, the ability of the phenolics to selectively absorb ammonia becomes less and less pronounced. For example, a water saturated phenolic liquid will typically absorb only about 40 moles of ammonia per mole of hydrogen sulfide and carbon dioxide, whereas a substantially anhydrous phenolic liquid, i.e., one containing less than about 5 percent (and preferably less than about 3 percent) water by weight based on total liquid weight, will absorb up to around 60 moles of ammonia per mole of hydrogen sulfide and carbon dioxide. Thus, it is preferred to conduct the process of the present invention in a substantially anhydrous system. Accordingly, preferred mixtures containing ammonia temperatures at least one of hydrogen sulfide and carbon dioxide and preferred phenolic liquids are those that are substantially anhydrous and most preferred are those that are for all practical purposes essentially water-free (i.e., those containing less than about 1 percent water, by weight).

Preferably, then, a substantially anhydrous gaseous mixture containing ammonia and at least one of hydrogen sulfide and carbon dioxide is passed upwardly through a conventional packed absorption tower which has a phenolic liquid flowing countercurrently and downwardly therethrough. The flow rates of the mixture and phenolic liquid are adjusted so that the ratio of total moles ammonia absorbed in the liquid to of phenolic in the liquid is between 0.5 and 1.0. The temperature during this absorption process is between about 70° and 175° F., and the pressure is around atmospheric pressure or higher. A mixture that is substantially ammonia-free is passed out the top of the tower while the phenolic liquid containing absorbed ammonia is removed from the tower bottom. Free ammonia is easily recoverable from this phenolic liquid simply by heat in a convention stripping column, typically to temperatures between about 150° and 400° F. and pressures from atmospheric to 20, 30 or 50 p.s.i. or higher. The resulting substantially ammonia-free phenolic liquid can be recycled to the absorption tower for further use.

It has also been found that the heat due to the reaction of ammonia with the phenolic liquid can cause the temperatures in the middle and lower portion of the absorption tower to exceed that which would otherwise be normal. Possibly, this is where most of the absorption occurs. Typically, the temperatures in the middle and lower portion of the absorption column are between about 95° and 175° F. with preferred temperatures in this zone of the tower being between about 100° and 160° F. and temperatures in the top of the tower being between about 70° and 130° F. Unless the temperature increase due to the heat of reaction is controlled, this hot zone can sometimes increase in size and migrate to the top of the tower thereby causing a decrease in absorption and selectivity. A convenient method of controlling this zone is by recycling a portion of the phenolic liquid containing absorbed ammonia from the tower bottom back to the tower at a point just about the hot zone. The ratio of the amount recycled to the tower to the amount going to the stripping column can vary, but typically a volume excess is recycled to the absorption tower, e.g., this ratio can be between 2.0 and 10.0.

DESCRIPTION OF SPECIFIC EMBODIMENT

EXAMPLE 1

A cresol composition containing 25 percent meta, 25 percent ortho and 50 percent para was used for this example.

Ammonia was mixed with the cresol at various molar ratios and hydrogen sulfide was then bubbled through the resulting phenolic liquid at 120° F. under a hydrogen sulfide blanket. At equilibrium a sample of the phenolic liquid was taken and analyzed for the molar ratio of ammonia to hydrogen sulfide. The results are reported in table 1 below:

TABLE 1

| Molar Ratio of Ammonia to Cresol | Molar Ratio Of Ammonia to Hydrogen Sulfide In Cresol |
| --- | --- |
| 0.1 | 14.0 |
| 0.2 | 16.1 |
| 0.3 | 22.3 |
| 0.4 | 29.6 |
| 0.5 | 35.5 |
| 0.6 | 42.9 |
| 0.7 | 47.6 |
| 0.8 | 57.5 |
| 0.9 | 56.7 |
| 1.0 | 25.2 |

As these data demonstrate, the molar ration of ammonia to hydrogen sulfide absorbed in the cresol increases substantially when the ratio of moles ammonia absorbed by the cresol to moles of cresol exceeds about 0.5.

EXAMPLE 2

Using the same cresol composition, temperature and procedure described in example 1, except that the cresol was saturated with water (about 12 percent by volume), the following results were obtained:

TABLE 2

| Molar Ratio of Ammonia to Cresol | Molar Ratio of Ammonia to Hydrogen Sulfide In Cresol |
| --- | --- |
| 0.4 | 25.5 |
| 0.5 | 27.4 |
| 0.6 | 30.8 |
| 0.7 | 34.1 |
| 0.8 | 38.4 |

A comparison of table 2 with table 1 will demonstrate the adverse effect of an excess amount of water on the ammonia absorption system.

EXAMPLE 3

A standard glass tubular absorption column 52 inches high and 3 inches I.D. was packed with a 24 inch section of ¼-inch Berl saddles and equipped in the standard manner to provide for gas-liquid contact.

A phenolic liquid was fed at a continuous rate into the top of the column and removed from the bottom. An ammonia rich gas was introduce into the bottom of the column so as to countercurrently contact the down flowing phenolic stream and was then withdrawn from the top of the column. In this manner, ammonia was absorbed by the phenolic stream so that the gas leaving the top of the column was substantially ammonia free.

The ammonia rich phenolic stream leaving the bottom of the column was transferred to a conventional stripper comprised of a bottom section 18 inches by 8 inches I.D. connected to an upper section 40 inches by 4 inches I.D. The ammonia rich phenolic liquid was heated to a temperature sufficient to strip substantially all of the ammonia in free form from the liquid. The resulting substantially ammonia-free phenolic liquid was then recycled back to the top of the absorption column for further use.

Using a cresol mixture containing 40 percent ortho with the remaining portion being about equal parts of meta and para, and feeding the cresol into the absorption column at the rate of 115 milliliters/minute while feeding a gaseous mixture containing essentially ammonia and hydrogen sulfide at a rate of 10 liters/minute ammonia and 2.5 liter/minute hydrogen sulfide, 99.9 percent of the ammonia present in the gas stream was absorbed by the cresols. The cresols leaving the absorption column contained 0.51 moles of ammonia per mole of cresol and the molar ratio of ammonia to hydrogen sulfide in the cresols was 219.

The temperature at the bottom of the column was 107° F. and the temperature at the top was 85° F.

The cresol containing absorbed ammonia from the bottom of the column was stripped with the bottom temperature of the stripper being 283° F and the top being 212° F. Approximately 97 percent of the ammonia was stripped from the cresol in this manner, and the resulting substantially ammonia free cresol was recycled to the absorption column.

EXAMPLE 4

Using the same equipment and procedure described in example 3 the absorption column temperatures were varied between 75° and 161° F. and strip temperatures between 205° and 306° F. were tested. The results varied, but generally between 99.6 and 99.9 percent of the ammonia fed into the absorption column was absorbed by the cresols.

In general, it was found that increases in pressure assisted both the absorption and stripping.

Experiments similar to those conducted above were run using mixtures of essentially ammonia carbon dioxide as well as ammonia, carbon dioxide and hydrogen sulfide and comparable results were attained.

We claim:

1. A process for separating ammonia from a mixture containing ammonia and at least one of hydrogen sulfide and carbon dioxide which comprises contacting the mixture with a phenolic liquid for a time sufficient to provide a ratio of total moles of ammonia absorbed by the liquid to moles of phenolic in the liquid between 0.5 and 1.0.

2. A process as defined in claim 1 wherein the temperature is between about 70° and 175° F.

3. A process as defined in claim 2 wherein the mixture is a gaseous mixture.

4. A process as defined in claim 3 wherein the mixture contains minor amounts of hydrocarbons, mercaptans and other weak acids.

5. A process as defined in claim 4 wherein the mixture is a gaseous mixture consisting essentially of ammonia and hydrogen sulfide with minor amounts of hydrocarbons, mercaptans and other weak acids.

6. A process as defined in claim 5 wherein the phenolic mixture is at least one of phenol; an alkyl phenol having up to six carbon atoms in the alkyl group; and alkoxy phenol having up to about six carbon atoms in the alkoxy group; a halophenol; a hydroxyphenol; naphthol; and a xylenol.

7. A process as defined in claim 6 wherein the phenolic liquid is substantially a mixture of phenol and the cresols.

8. A process as defined in claim 7 wherein the phenolic liquid and the mixture are substantially anhydrous.

9. A continuous process for separating ammonia from a gaseous mixture containing ammonia and at least one of hydrogen sulfide and carbon dioxide which comprises countercurrently contacting a gaseous mixture having a temperature between about 70° and 130° F. with a phenolic liquid having a temperature between about 100° and 160° F. for a time sufficient to provide a ratio of total moles of ammonia absorbed by the liquid between 0.5 and 1.0; thereafter separating the resulting substantially ammonia-free gaseous mixture from the resulting phenolic liquid containing absorbed ammonia; heating the phenolic liquid containing ammonia so as to remove substantially all of the ammonia from the liquid; and then using the phenolic liquid from which ammonia has been removed as a recycle stream.

10. A process as described in claim 9 which contains the additional step of using a portion of the resulting phenolic liquid containing absorbed ammonia as a recycle stream so as to keep the temperature of reaction between ammonia and phenolic liquid between about 95° and 175° F.

PO-1050
(5/69)

UNITED STATES PATENT OFFICE
CERTIFICATE OF CORRECTION

Patent No. 3,607,047                    Dated  September 21, 1971

Inventor(s)  Henry T. Broom et al

It is certified that error appears in the above-identified patent and that said Letters Patent are hereby corrected as shown below:

First page, left-hand column, seventh line, "Lowe-Baker" should read -- Howe-Baker --.

Column 1, line 73, "phenol p-ethoxy" should read -- p-ethoxy --.

Column 2, lines 42 and 43, "phenol liquid the countercurrently" should read -- to the ammonia --; line 68, "to of" should read -- to moles of --; line 75, "heat" should read -- heating --.

Column 4, line 66, "ammonia carbon" should read -- ammonia and carbon --.

Column 5, line 9, claim 5, "week" should read -- weak --.

Signed and sealed this 4th day of April 1972.

(SEAL)
Attest:

EDWARD M. FLETCHER, JR.           ROBERT GOTTSCHALK
Attesting Officer                 Commissioner of Patents